(12) United States Patent
Verhoeven

(10) Patent No.: US 6,508,112 B1
(45) Date of Patent: Jan. 21, 2003

(54) TOMOGRAPHIC SPRAY MOMENTUM MAPPING SYSTEM

(76) Inventor: Dean Verhoeven, 442 Pineview Dr., Wake Forest, NC (US) 27587

( * ) Notice: Subject to any disclaimer, the term of this patent is extended or adjusted under 35 U.S.C. 154(b) by 0 days.

(21) Appl. No.: 09/489,097

(22) Filed: Jan. 21, 2000

(51) Int. Cl.[7] .............................................. G01M 15/00
(52) U.S. Cl. ..................................................... 73/119 A
(58) Field of Search ............................ 73/865.8, 865.9, 73/119 A, 861.71

(56) References Cited

U.S. PATENT DOCUMENTS

| | | | |
|---|---|---|---|
| 2,756,591 A | 7/1956 | Hagerty et al. | 73/119 |
| 3,338,093 A | 8/1967 | Usry et al. | 73/119 |
| 3,449,948 A | 6/1969 | Kahle et al. | 73/119 |
| 3,459,049 A | 8/1969 | Kamps | 73/432 |
| 4,165,635 A | 8/1979 | Komaroff et al. | 73/119 |
| 4,317,178 A | 2/1982 | Head | 364/510 |
| 4,397,190 A | 8/1983 | Hulin | 73/861.04 |
| 4,648,279 A | 3/1987 | Lew | 73/861.71 |
| 4,715,232 A | 12/1987 | Buettner | 73/861.49 |
| 4,920,808 A | 5/1990 | Sommer | 73/861.41 |
| 5,003,810 A | 4/1991 | Jepson et al. | 73/3 |
| 5,120,951 A | 6/1992 | Small | 250/227.21 |
| 5,663,508 A | 9/1997 | Sparks | 73/861.71 |
| 5,686,989 A | 11/1997 | Hoffman et al. | 356/336 |
| 5,753,806 A | 5/1998 | Ryan et al. | 73/119 A |
| 6,049,382 A * | 4/2000 | Lazaro Gomez | |

* cited by examiner

*Primary Examiner*—Robert Raevis
(74) *Attorney, Agent, or Firm*—Clifford F. Rey

(57) ABSTRACT

A tomographic spray momentum mapping system and method of use for determining the spray momentum of dense, high-pressure sprays such as petroleum-based fuel sprays discharged from electronically-controlled fuel injection systems is disclosed. The present system comprises a mechanical probe assembly having a probe wire drawn across a Y-shaped handle, which includes a force transducer attached in operative relation thereto that receives force input from the impact of the spray impinging on the probe wire and generates output signals in response thereto. The probe assembly is traversed through the spray to obtain force measurements at selected points therein. The present system includes a coordinate measuring apparatus for precisely positioning the probe wire within the spray structure. The output signals derived from the transducer are processed through signal conditioning electronics and input to a computer system, which utilizes a computed topography software program to process the force measurements and convert the integrated measurements into tomographic reconstructions showing the spray momentum distribution in a two- or three-dimensional domain. This information is used directly for understanding spray structure and improvement of injection systems, and indirectly for improvement of computer spray models used to simulate engine performance.

15 Claims, 8 Drawing Sheets

TOMOGRAPHIC SPRAY MOMENTUM MAPPING SYSTEM

FIELD OF THE INVENTION

This invention relates to a measurement system and method for probing dense, high pressure sprays and, more particularly, to a tomographic spray momentum mapping system, which utilizes a mechanical wire probe to obtain spray momentum measurements throughout the spray and a computed topography software program for processing and integrating these measurements for mapping the spray momentum distribution.

BACKGROUND OF THE INVENTION

A compression-ignition ("CI")engine, first developed for diesel fuel, is an engine that does not use a spark to ignite fuel. When air is compressed and fuel is injected into a CI engine, the fuel ignites. A direct-injection ("DI")engine is an engine in which the fuel is injected by mechanical action into the combustion chamber. Compression-ignition, direct-injection ("CIDI")engines are used predominantly in the trucking, rail and shipping industries.

The recent development of high-pressure, electronically-controlled injection systems has made it possible to improve CIDI engines to the point where they are suitable for use in passenger vehicles as well. The outstanding benefit of this type of engine is its very good fuel economy, which has the potential to significantly reduce the nation's fuel use, as well as reducing the production of carbon dioxide by passenger vehicles. The drawbacks of CIDI engines are its high emissions, primarily nitrous oxides and particulates, for which satisfactory exhaust after-treatment does not yet exist.

In order to further improve the efficiency and to reduce emissions in CIDI engines, it is necessary to understand the fundamental physical processes that take place in the engine's combustion chambers. Formation and destruction of pollutants are controlled to a great extent by the mixing process. In turn the efficiency of in-cylinder mixing is dependent upon the fuel spray created by the fuel injector. In order to reduce the amount of pollutants formed by the engine, it is advantageous to study the characteristics of the fuel spray structure. Fuel spray studies provide insight into the spray-gas mixing process and facilitate development and evaluation of new injection hardware and fuel injection strategies. Such analysis can also provide data for the development and improvement of computer models of the spray and its combustion.

Because of the lack of experimental tools suitable for probing dense, high pressure fuel sprays, researchers currently lack information necessary for the improvement of engine performance. Thus, the present tomographic spray momentum mapping system has been developed to provide researchers with a practical tool suitable for probing dense, high pressure fuel sprays.

The ability to measure momentum distributions in sprays will be of even greater importance in the future if new fuels such as dimethyl-ether or "bio-diesel" fuel gain importance. These fuels generally have physical properties such as viscosity and distillation curves significantly different from those of current fuels. These fuels can markedly change the characteristics of fuel spray and have a substantial effect on combustion quality. Further, it may be necessary to modify fuel injection hardware in order to exploit these fuels making accurate analysis of fuel spray characteristics critical to engine and injection system manufacturers.

DESCRIPTION OF RELATED PRIOR ART

Currently, sprays are primarily studied using optical techniques such as direct imaging and laser Doppler velocimetry. Direct imaging techniques provide information on physical characteristics such as spray penetration, spray angle, the initial dispersion angle of the nozzle, initial spray tip speeds, and total momentum measurement. Doppler velocimetry techniques provide information regarding particle velocity, particle size, spray angle variations and spray asymmetry.

However, because of the high density of diesel sprays, the information obtained by optical techniques is necessarily limited to that which may be obtained in the outer envelope of the spray. These techniques do not provide critical information such as velocity, mass, and droplet size distribution within the spray and, more particularly, near the fuel injector nozzle. A further limitation of optical techniques is that only thin sprays can be studied due to the need for optical transparency of the sprays. In contrast the use of the mechanical spray probe of the present system eliminates the need for optical transparency, and even the interior portions of dense fuel sprays may be investigated.

One example of a prior art method of measuring fluid streams is shown in U.S. Pat. No. 3,338,093 to Usry et al. which discloses a device for measuring the momentum and solidity of fluid free streams from injection valves by causing a wire of generally triangular cross-section to transect the stream in such a manner that the stream impinges on the base of the triangle measuring the position of the wire and the force of the fluid impinging on the wire.

Another example of prior art spray analysis is shown in U.S. Pat. No. 2,756,591 to Hagerty et al. which discloses a spray analyzer that has a probe to be positioned in the spray and that provides a permanent record of the spray performance in the form of a chart reading mass distribution or momentum changes along the ordinate and angular displacement around the circle of a round or conical spray along the abscissa of the chart.

Another example of a prior art spray analysis is illustrated in U.S. Pat. No. 3,449,948 to Willowick et al. which discloses a nozzle spray test device for determining spray cone vertex angle of fuel injection nozzles. In this device the injection nozzle to be tested is clamped in the test device and connected to a fuel pressure source, the conical fuel spray issuing from the nozzle being directed into a chamber having aligned detectors or probes which are adjustable radially inwardly or outwardly to be impinged by elements of the conical fuel spray.

Another example of a prior art device for spray analysis is shown in U.S. Pat. No. 5,753,806 to Ryan et al. which discloses an apparatus and method for determining the distribution and flow rate characteristics of an injection nozzle wherein a plurality of piezoelectric sensors are disposed in a spatial array around the ports of an injection nozzle. Separate electrical signals proportional to the instantaneous momentum of fluid discharged from the injection nozzle and impacting on each of the sensors are used to calculate the instantaneous momentum and mass flow rate of fluid impacting each of the sensors.

Another example of prior art spray analysis is disclosed in U.S. Pat. No. 5,686,989 to Hoffman et al. which shows a transient spray patternator. This device utilizes a honeycomb structure to collect the spray in individual tubes positioned through a given cross-section of the spray permitting measurement of the mass flux distribution, penetration rates, droplet sizing and distribution within either a steady state or transient spray pattern.

Another example of prior art fluid flow analysis is shown in U.S. Pat. No. 5,663,508 to Sparks which discloses a silicon flow sensor wherein the primary sensing component is preferably formed by a single silicon chip on which associated signal conditioning and compensating circuitry can be provided. The flow sensor is intended for purposes such as determining the flow rate of intake air to an automotive engine.

Another example of prior art fluid flow analysis is illustrated in U.S. Pat. No. 5,120,951 to Small which discloses an optoelectronic motion and fluid flow sensor wherein a resilient member is fixedly supported at one end thereof and entrained in the fluid for varying the amount of light incident on the photosensor from the light source as a function of the amount of deflection of the resilient member caused by motion of the fluid in a passageway.

Another example of prior art fluid flow analysis is shown in U.S. Pat. No. 4,920,808 to Sommer which discloses a device and method for measuring the flow velocity of a free flow in three dimensions in the case of strongly fluctuating incident flow directions such that the flow measuring device is aligned in the flow by means of a servo-mechanism in such a way that its central axis extends in the direction of flow, the pressure being measured at several points on the front spherical cap thereof.

Another example of a prior art flow measuring system is described in U.S. Pat. No. 4,715,232 to Buettner which discloses a flow measuring system employing a manometer and a pilot rod having at least two orifices and wherein upset or temporary inversion of the manometer will not result in backflow of any indicating liquid into the primary liquid carrying pipeline.

Another example of a prior art fluid measuring system is shown in U.S. Pat. No. 4,648,278 to Lew which discloses a spiral coil target flowmeter employing a spiral coil target coaxially disposed within a flow passage included in the body of the flowmeter wherein the drag and/or torque imposed on the spiral core target by the moving fluid medium is measured and converted to the flow rate of the fluid medium moving through the flow passage.

Another example of a prior art fluid flow device is illustrated in U.S. Pat. No. 4,397,190 to Hulin which discloses an apparatus and method for determining flow characteristics of a polyphase fluid flowing in a conduit wherein two differential pressure sensors are provided, each having two pressure ports sensitive to local pressure variation in the fluid. The pressure ports are maintained in a predetermined spatial relationship and in a predetermined orientation relative to the general direction of the flow.

Another example of a prior art fluid flow measurement method is shown in U.S. Pat. No. 4,317,178 to Head which discloses a method and systems for conducting a multiple velocity traverse of a flow stream cross section of a known shape and area to determine flow therethrough.

Another example of prior art fluid flow measurement is described in U.S. Pat. No. 5,003,810 to Jepson et al. which discloses a fluid meter comprising at least three sensors each having an output dependent on a respective characteristic of the fluid to be monitored, circuitry to combine the outputs of two of the sensors to provide a measurement of mass flowrate of the fluid, and to combine the outputs of the three sensors to provide an error signal which can be used to recalibrate the measurement.

Another example of prior art fuel spray testing is shown in U.S. Pat. No. 4,165,635 to Komaroff et al. which discloses a method of testing fuel-injector spray nozzles with respect to proper buzzing and seal tightness wherein a laser beam is directed onto a light detector along a path passing close to the spray orifice(s) of a fuel-injection spray nozzle.

Another example of prior art spray pattern measurement is shown in U.S. Pat. No. 3,459,049 to Kamps wherein a pattern separator in the form of flow dividing partitions is placed in spaced proximity to a nozzle or spray head and the fluid emerging from the nozzle is collected, identified with the orifices in the several nozzle areas, and lead off to a series of individual measuring devices also identified with the several spray head areas.

The use of a probe to measure both the total momentum and the momentum at a single point in the spray is disclosed in a German publication, *Messung der Strahlkraft und-bewegungsgrösse zur Beurteilung der Zerstäubungsgüte von Einspritzstrahlen*, by Iwan Komoroff und Kurt Melcher, Bosch Techn. Berichte 3—Heft 6—Dezember 1971 and cited herein. Komoroff and Melcher measured the momentum of a spray by using a circular plate attached to a force transducer. In this device the circular plate may be larger than the spray diameter to measure the total spray momentum, or small enough to sample only a small portion of the spray. However, this type of mechanical probe has inherent disadvantages in that it strongly perturbs the spray, its resolution is insufficient for making spatially-resolved measurements near the nozzle, and the signal obtained from a probe with reasonable spatial resolution is very weak.

A technical advance is achieved in the present invention by the use of a minimally intrusive, fine gauge, wire probe integrated with a force transducer, which is traversed through the spray in a plane perpendicular to its geometric axis. The spray impinges on the wire probe to produce force measurements, which are input to a computed topography software program in a computer. Computed topography (CT) is an imaging technique that uses an array of detectors or measurements to collect information from an object. The information or data collected is utilized by a computer to reconstruct the structure of the object, and the resulting image can be displayed, for example, on a computer screen.

Computed topography was first used about 35 years ago to "reconstruct" the density distribution in a patient's body from measurements of the attenuation, of x-ray radiation passed through it. Since that time CT has been used by researchers in the, physical sciences and engineering for applications in which only integral (as opposed to pointwise) measurements are available. Computed topography techniques make it possible to convert these integrated measurements into a map giving the quantity of interest at each point in a 2- or 3-dimensional domain.

Advantageously, the tomographic spray momentum mapping system of the present invention provides a innovative tool for probing dense, high-pressure sprays by using integrated measurements combined with tomographic data processing to reconstruct spray momentum distributions for analysis.

SUMMARY OF THE INVENTION

Accordingly, the present invention provides a tomographic spray momentum mapping system and method suitable for probing and determining the spray momentum at all points of dense, high pressure sprays. It is based on a minimally-intrusive, mechanical probe, which is traversed through the spray to obtain momentum measurements at selected points throughout the spray. The present method utilizes computed topography techniques to convert these measurements into a map giving the spray momentum in a two or three-dimensional domain.

The spray probe assembly consists of a fine gauge wire stretched and held in a Y-shaped yoke or handle. The wire is traversed through the spray in a plane perpendicular to the geometric axis of the spray. An energy-transforming transducer attached in operative relation to the yoke receives a force input from the impact of the spray with the probe wire and generates output measurements, which are proportional to the integrated total force exerted by the spray on the wire.

The output measurements derived from the transducer are electronically conditioned and input to a computer system. In the computer, a tomographic software program processes the force measurements to provide the spray momentum at all points in the spray. This information may be used directly for understanding spray structure and improvement of injection systems, and indirectly for improvement of computer spray models used to simulate engine performance.

Other features and advantages of the present invention will become apparent from a study of the following description and the accompanying drawings.

BRIEF DESCRIPTION OF THE DRAWINGS

The novel features of the present inventions are set forth in the appended claims. The inventions itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
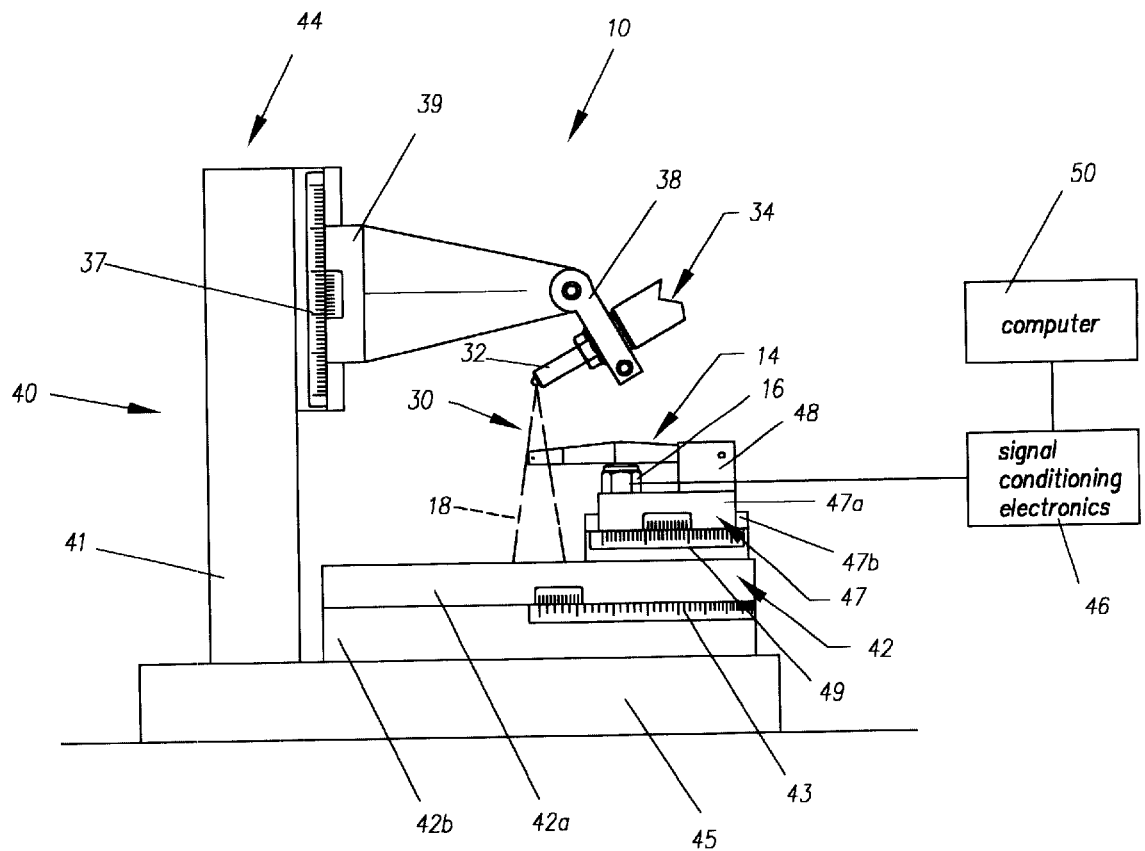
FIG. 1 is a diagrammatic view of the present tomographic spray momentum mapping system showing the components thereof.

With further reference to the drawings there is shown therein a diagrammatic view of the present tomographic spray momentum mapping system, indicated generally at 10, and illustrated in FIG. 1.

The present system is comprised of a spray probe assembly, indicated generally at 30, which is adapted for removable attachment to a coordinate measuring apparatus, indicated generally at 40, including a rotary positioning table, indicated generally at 42, and an injector support column, indicated generally at 44, for positioning the probe assembly 30 within a three-dimensional polar coordinate system, which is superimposed on the spray structure to obtain measurements at selected points in the spray 18.

The coordinate measuring apparatus 40 as shown in FIG. 1 provides a means for positioning the probe assembly 30 at any number of distances and angular orientations relative to the geometric axis of the spray 18. Such coordinate measuring apparatus 40 includes, for example, positioning means including but not limited to those hereinafter described. A rotary positioning table 42 capable of imparting 360° rotation to objects disposed thereon including a rotatable plate 42a and a stationary plate 42b is fixedly attached to a supporting base 45. Plates 42a and 42b are coaxial being interconnected by means of a rotary adjusting mechanism including Vernier read-out scales as at 43 to provide incremental angular adjustment therebetween. The rotary adjusting mechanism may be manually operated or, in the alternative, automatically operated by computer.

The apparatus 40 also features a linear positioning device, indicated generally at 47, capable of imparting linear movement along a diameter of the table 42, including a fixed track 47b which is fixedly attached to the rotatable plate 42a and a moveable carrier 47a. Track 47b and carrier 47a are interconnected by means of a linear adjusting mechanism including Vernier read-out scales as at 49 to provide incremental linear adjustment therebetween. An adjustable holding fixture 48 wherein the probe assembly resides during use is detachable engaged to carrier 47a. Fixture 48 is capable of imparting pivoting movement to the probe assembly 10 in both horizontal and vertical planes.

The apparatus 40 also includes an injector support column 44 comprised of a vertically disposed platen 41 whereon an injector support arm 39 is traversed to position the fuel injector 34 to be tested in a vertical plane. A terminal end of the support arm 39 is mechanically coupled to a pivoting clamp 38 for securing the injector 34 in position. The vertical platen 41 and the injector support arm 39 are also interconnected by means of a linear adjusting mechanism including Vernier readout scales as at 37, which is adjusted manually or by automatic controls.

The probe assembly 10 includes an energy transforming device such as a transducer 16, which receives input from the impact of the fuel spray 18 with a stretched wire 12 in the probe assembly 30 and generates output signals in response thereto. Such output signals or force measurements derived from the transducer 16 are conditioned as at block 46 and sent to a computer 50 to be processed using computed topography (CT) techniques to convert the integrated measurements into a map showing the spray momentum in a two- or three-dimensional domain.

The present system 10 has been developed for studying the physical characteristics of a dense, high pressure fuel spray 18 as shown in phantom outline in FIG. 1. For purposes of this application such a fuel spray 18 is, for example, is representative of a fuel spray delivered by a spray nozzle 32 of a fuel injector 34 into the combustion chambers of compression-ignition, direct injection (CIDI) engines, which utilize electronicaliy-controlled fuel injection systems.

Although the present system will be described herein with reference to such fuel sprays and injection systems, it will be understood that the present system may be utilized with other types of fuels including, but not limited to, petroleum-based fuels, dimethyl-ether fuels, and bio-diesel fuels, and with other mechanical fuel injection and carburetion systems. Thus, the examples disclosed herein are intended to be illustrative of the present invention and are not to be interpreted as being restrictive in any sense.

Figure 2A:
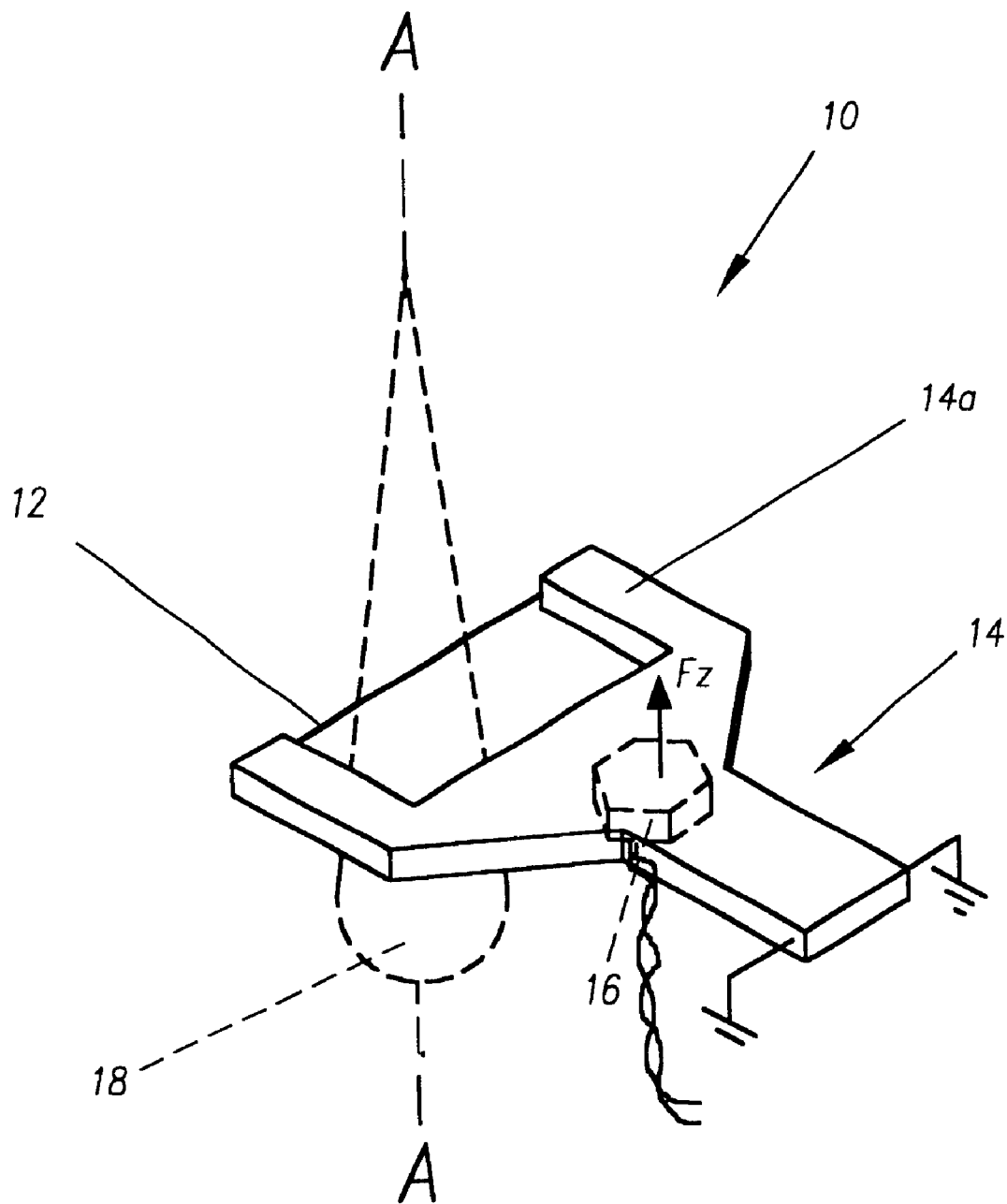
FIG. 2A is a perspective view of probe assembly of the present system disposed in perpendicular relation to the geometric axis of the spray.
Figure 2B:
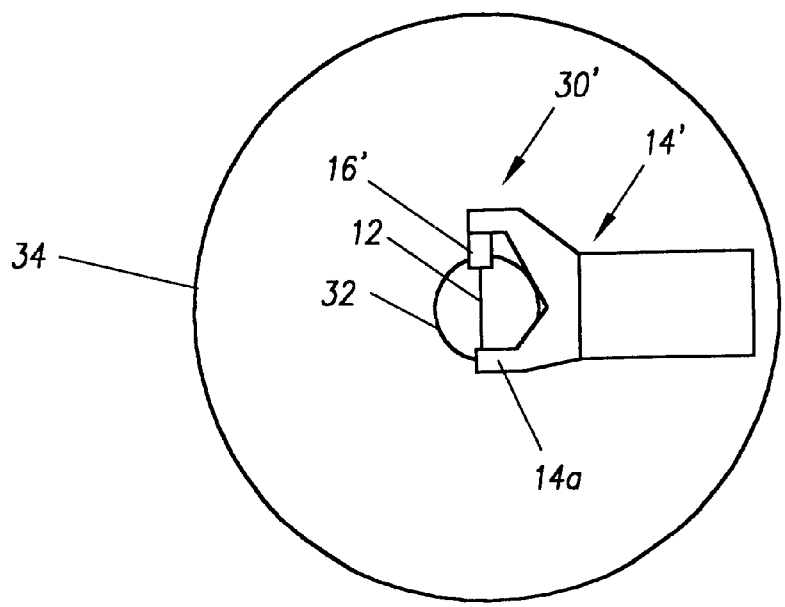
FIG. 2B is a bottom plan view of an alternative embodiment of the probe assembly showing a modified transducer configuration.
Figure 2C:
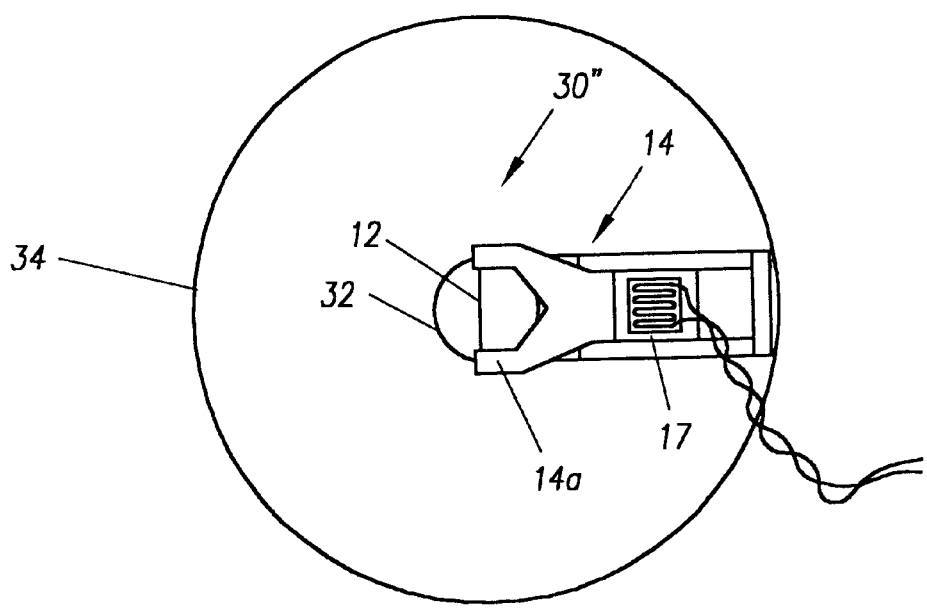
FIG. 2C is a bottom plan view of an alternative embodiment of the probe assembly showing a strain gage integrated therein.

Referring now to FIG. 2A, the probe assembly 30 is comprised of a light gauge wire 12 in the range of about 150 um (0.006") of a material such as piano wire, stainless steel, synthetic fiber or other suitable material which is stretched and held under a predetermined tension in a Y-shaped yoke or handle, indicated generally at 14.

In the preferred embodiment the yoke 14 is constructed of a material such as fiber-reinforced plastic, stainless steel, or other material having specific physical properties stable for this application.

At least one transducer 16 or similar energy transforming device being capable of measuring impulses created by the impact of the spray as at 18 with the wire 12 and generating a data output signal in response thereto is mechanically attached in operative relation to the yoke 14 as shown in FIG. 2A. Any number of commercially available, energy-transforming transducers 16 of the type which produce an electrical output signal in response to changing input or stress such as quartz crystal transducers are suitable for this application.

In the configuration shown in FIG. 2A, the transducer 16 is disposed in operative relation to yoke 14 on an underside thereof so as measure the downward force of the spray 18 impinging upon the wire 12.

Of course, other alternative transducer configurations may be preferable for a given application of the present system For example FIG. 2B illustrates an alternative configuration showing a probe assembly 30' wherein the transducer 16' is mechanically coupled in direct connection to the wire 12 adjacent a prong member 14*a* of the yoke 14. This configuration provides increased sensitivity and a stronger output signal from the transducer, which may be preferable in probing sprays of lower density and pressure.

In another alternative embodiment shown in FIG. 2C, the probe assembly 30" includes a so-called strain gage 17 integrated therein, which is capable of detecting miniscule movements of the yoke 14 caused by the force of the spray 18 impinging on the wire 12, which may be preferable in some applications.

Since such transducers and strain gages are well known to those skilled in the art, further detailed discussion thereof is not deemed necessary.

The resonance frequency of the wire 12, yoke 14, and transducer 16 in combination should be about three times the frequency of any naturally-occurring flow structures in the spray 18 in order to avoid resonant vibrations in the probe assembly 10. It will be noted that the resonant frequency of a stretched wire is a function of the wire's density, length and strength ie. allowable tension. The lowest resonant frequency of a stretched wire varies from 50 to 25 kHz for lengths from 0.25 to 0.5 inches.

Observations of the spray s es created by a common-rail fuel injection system show that temporal frequencies of these structures range from 20–100 kHz depending on the distance from the injector nozzle and the injection pressure. Some mechanical damping and electronic filtering may also be necessary to control resonances. These observations are disclosed in the printed publication, *Velocities and Structure of Atomizing Diesel Sprays* by E. Winkelhofer, ILASS Europe 97, Florence, Italy, Jul. 3–11 1997 and cited herein.

In practical use of the present system the probe assembly 30 is installed in the coordinate measuring apparatus 40 and positioned at a selected point lying within the spray structure to be analyzed. Thereafter, the probe wire 12 is traversed through the spray 18 in a plane perpendicular to the spray's axis A at the selected position. The spray 18 impinging on the wire 12 exerts a force on it; the integrated total force $F_Z$ as depicted in FIG. 1 is measured by the force transducer 16. The measured force is related to the momentum distribution in the spray by the equation:

$$F_z=\int \beta.u(x,y).\rho(x,y)u(x,y)\phi dy=\beta.\phi\int u^2(x,y).\rho(x,y)dy$$

wherein u(x,y) is the speed of the spray at (x,y), ρ(x,y) is the mass density at (x,y), φ is the diameter of the wire 12, and β is an impact parameter giving an average percentage of axial momentum lost by a droplet hitting the wire 12. The integration is carried out along the length of the wire 12. The parameter β may be determined by measuring the total momentum of the flow ($J_{tot}$) by allowing the spray 18 to strike directly the force transducer 16, and dividing the value of the total momentum found by the stretched-wire probe assembly 10 by this value:

$$\beta=\frac{1}{J_{tot}\phi}\int F_z dx$$

The force measured with the stretched-wire probe assembly 10 is proportional to the local momentum of the flow, $u^2(x,y).\rho(x,y)$, integrated along the probe wire 12. In order to convert this integrated quantity to a map of the momentum throughout the spray 18, the techniques of computed topography (CT) are utilized. CT techniques make it possible to convert these integrated measurements into a map giving the spray momentum at each point (x, y, z) in a 2- or 3 dimensional domain.

Because such computed topography software programs for other applications are in a practical state of development and are well known to those skilled in the art, further detailed description of the same is not deemed necessary.

The capability and accuracy of computed topography (CT) can be demonstrated and evaluated through the use of simulated data In the computed topography process a simulated momentum distribution is defined, the integrated force data which would be measured from this distribution is computed, and this data is processed using the topography software program. The computed topography process and its capabilities are illustrated with reference to the following drawing figures.

FIGS. 3A and 3B show simulated momentum distributions in a plane perpendicular to the geometric axis A of the spray. FIG. 3A is a graphic representation of a fairly smooth but asymmetric momentum distribution, indicated generally at 20, expressed in arbitrary units. FIG. 3B is a momentum distribution, indicated generally at 22, expressed in arbitrary units with non-uniformities of the kind that may be expected, for instance, in fuel injector nozzles during opening and closing thereof These non-uniformities are exaggerated to demonstrate the capabilities of computed topography processing.

FIG. 4 shows the scanning geometry which is simulated by numerically integrating the momentum distributions using probe wire 12 through a cross-section of the spray 18 at an angular orientation (α°) as at 24. The scanning direction is indicated by directional arrows 26. The force on wire 12 passing through the spray 18 at a number of distances from the spray axis A and for a number of angular orientations is computed.

The spatial resolution of this technique is estimated to be roughly equal to the diameter of the probe wire 12, which is about 150 µm (0.006"). This is sufficient to make measurements as close as 5 mm to the fuel injector nozzle 34. Because the measured signal is equal to the integral of the force exerted by the spray 18 along the wire 12, the signal obtained with the probe wire 12 will be much larger, for example, than with a circular plate probe (not shown) of the same spatial resolution.

Figure 3A:
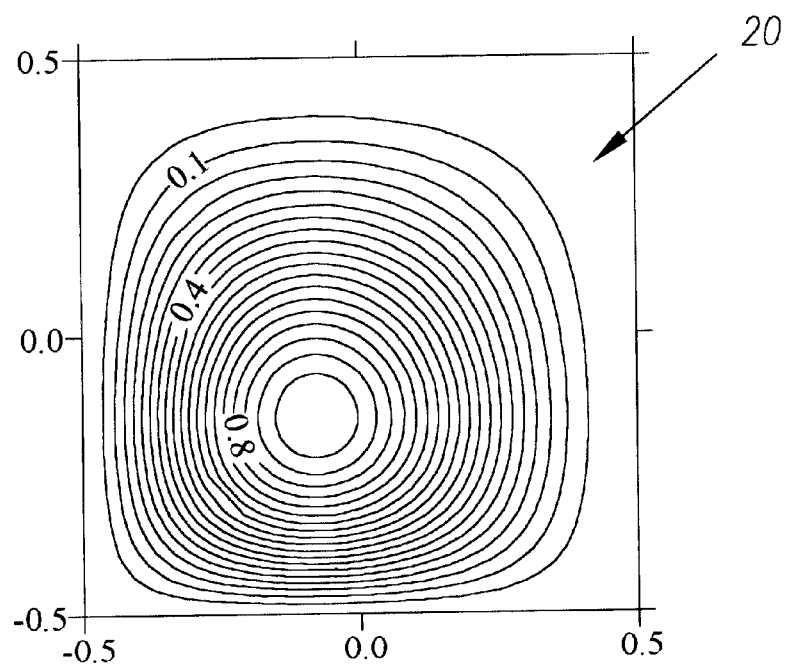
FIG. 3A is a graphic representation of a simulated momentum distribution in a cross-section perpendicular to the geometric axis of the spray.
Figure 5A:
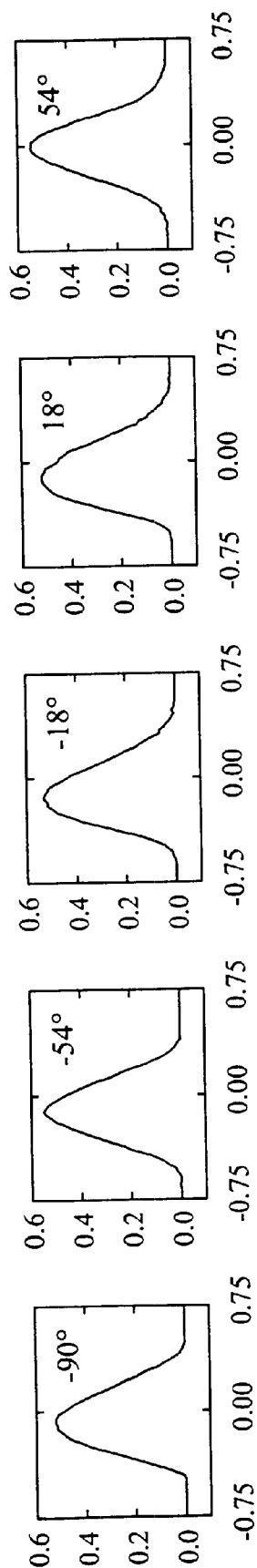
FIG. 5A shows a scan of the asymmetric momentum distribution of FIG. 3A.

FIG. 5A shows the resulting data of five simulated angular orientations: −90°, −54°, −18°, 18°, and 54° in the case of the asymmetric distribution of FIG. 3A. The abscissa is the distance of the scanning wire 12 from the geometric axis A of the spray 18, the ordinate is the axial force on the wire 12 expressed in arbitrary units.

Figure 3B:
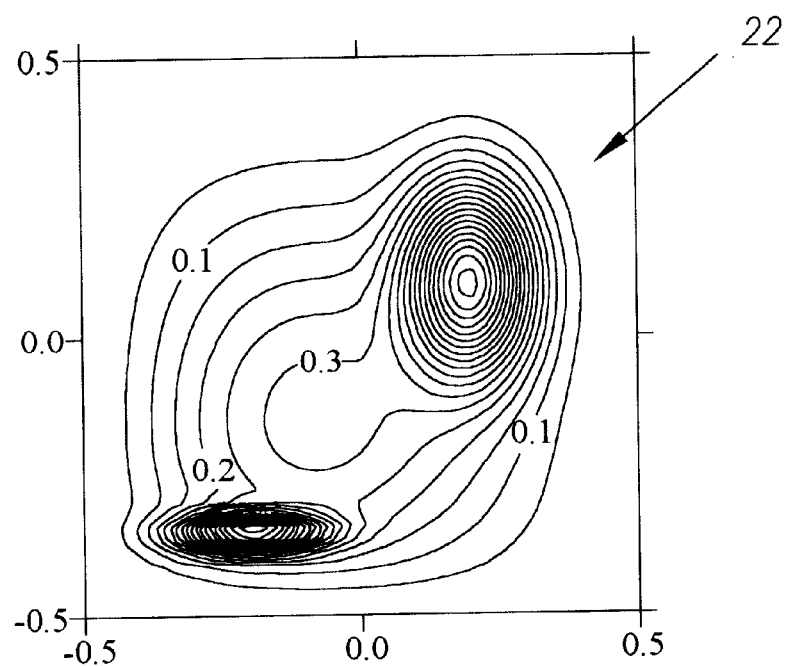
FIG. 3B is a graphic representation of a simulated momentum distribution with non-uniformities in a cross-section perpendicular to the geometric axis of the spray.
Figure 4:
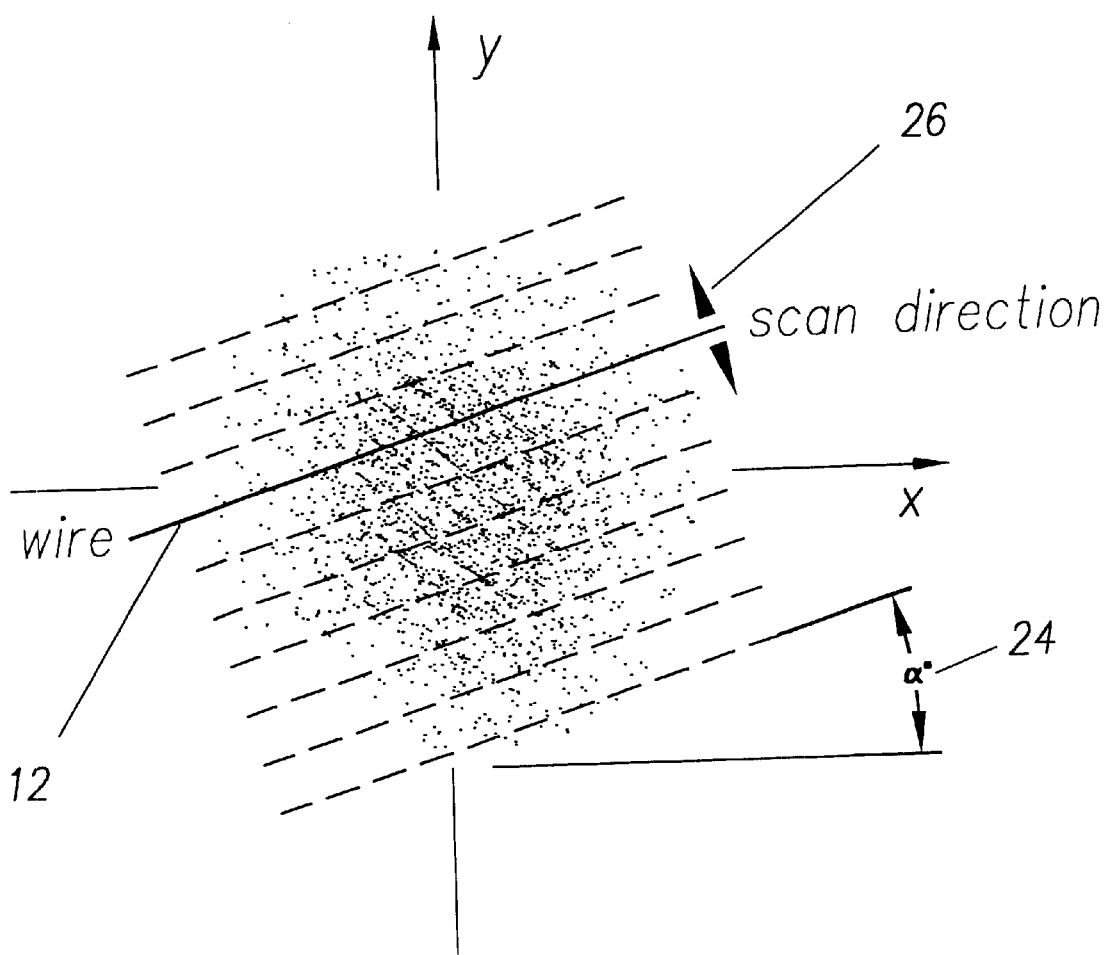
FIG. 4 is a graphic representation of the scanning geometry that is simulated by numerically integrating the momentum distributions.
Figure 5B:
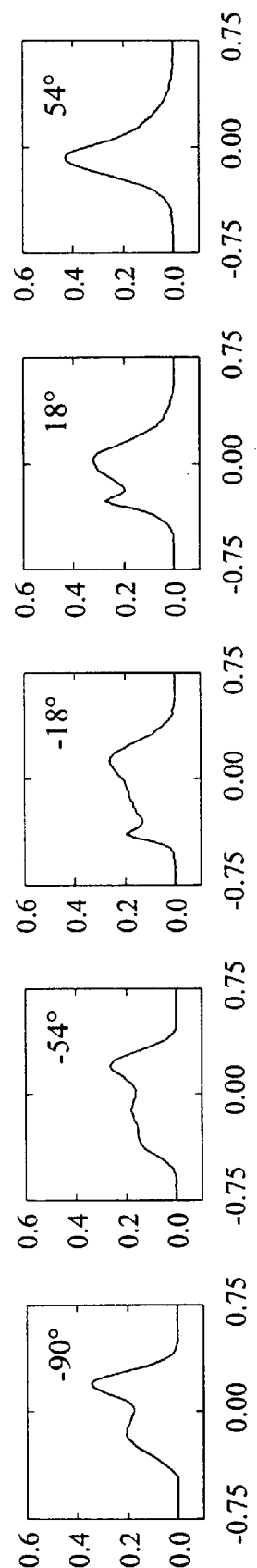
FIG. 5B shows a scan of the asymmetric momentum distribution with non-uniformities of FIG. 3B.

FIG. 5B shows the resulting data of five simulated angular orientations: −90°, −54°, −18°, 18°, and 54° in the case of the asymmetric distribution with non-uniformities of FIG. 3B. Such non-uniformities are of the kind that may be expected, for instance in valve cover orifice (VCO) nozzles during opening and closing, or in the case of needle oscillations within the nozzle. These non-uniformities are exaggerated for purposes of illustration. As in FIG. 5A, the abscissa is the distance of the scanning wire from the geometric axis of the spray 18, the ordinate is the axial force on the wire 12 expressed in arbitrary units.

Figure 6A:
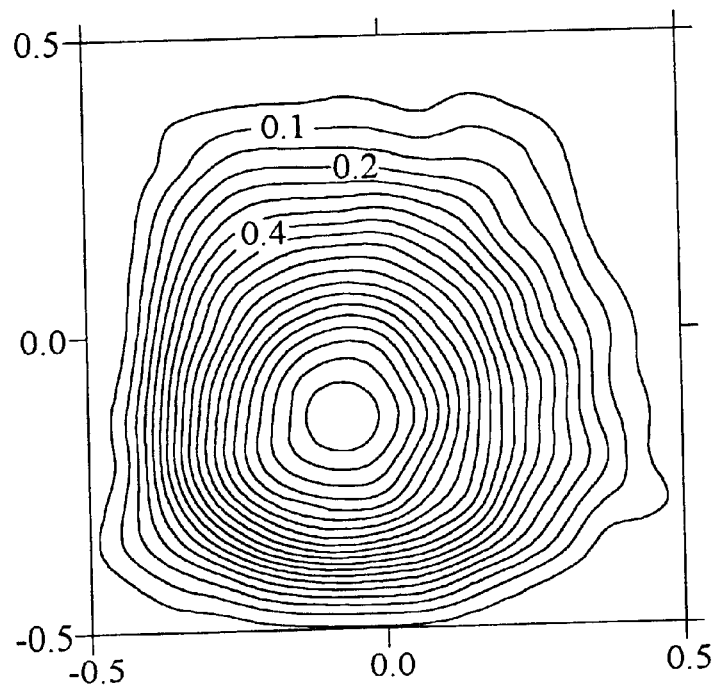
FIG. 6A shows momentum distributions reconstructed from scan data of FIG. 5A.
Figure 6B:
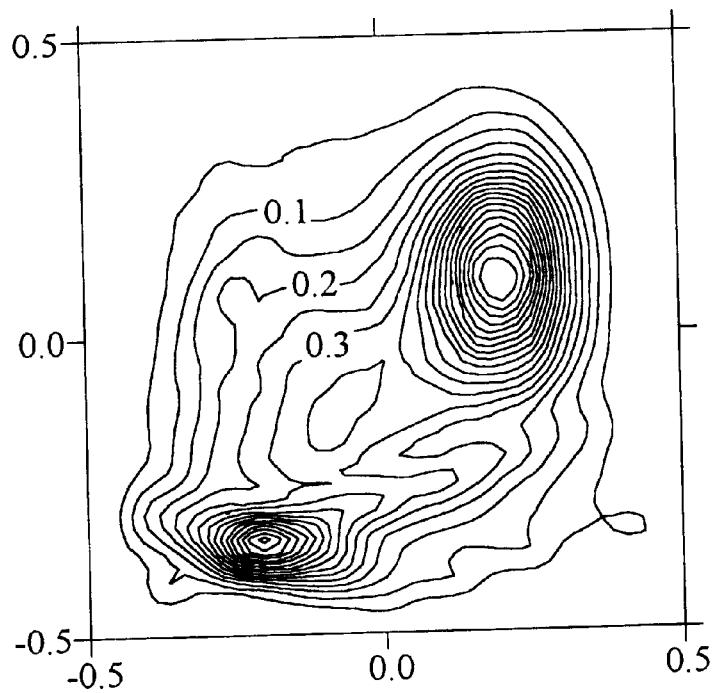
FIG. 6B shows momentum distributions reconstructed from scan data of FIG. 5B.

The data of FIGS. 5A and 5B is used as input to a computed topography program, which computes a resulting momentum distribution. The simulated results for the data of FIGS. 5A and 5B are shown respectively in FIGS. 6A and 6B. The reconstructions shown were computed with data from only five simulated scans. The results may be improved if necessary by using more scans. This process may of course be repeated for a number of axial positions to reconstruct the entire 3-dimensional momentum distribution in the spray 18. Given ensemble averaged, temporally resolved force measurements, the present system will produce ensemble averaged, temporally and spatially resolved momentum distributions.

The momentum of a portion of the spray 18 is a product of the local mass flux and the velocity. If the density of each point in the spray can be determined in addition to the momentum distribution, the velocity distribution can be determined from their combination. The mass distribution in the spray 18 can also be determined tomographically using penetration radiation (such as soft x-rays). Measured mass and velocity distributions near the injector nozzle can be a great aid in the understanding of spray formation, in the improvement of injection hardware, and in the improvement of computer spray models.

Although not specifically illustrated in the drawings, it should be understood that additional equipment and structural components will be provided as necessary, and that all of the components described above are arranged and supported in an appropriate fashion to form a complete and operative system incorporating features of the present invention.

It is also understood that variations may be made in the present invention without departing from the scope of the invention. For example, for obtaining measurements in close proximity to the injector nozzles, it is desirable to limit the length of the probe wire 12. It is contemplated that a modified adjustable-width yoke (not shown) capable of varying the length of the exposed wire 12 would be advantageous to make measurements both near the injector nozzle and further away from the nozzle.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A tomographic spray momentum mapping system for probing a dense, high pressure spray discharged from a fuel injector nozzle, said system comprising:

a probe assembly including a probe wire drawn across a yoke;

an energy transforming means disposed in operative relation to said yoke being capable of measuring the force impinged by said spray on said wire and generating data output signals in response thereto;

positioning means for placing said probe wire at selected points within said spray; and a computer system interconnected with said energy transforming means, wherein said computer system includes a computed topography software program for combining said output signals to calculate tomographic reconstructions of spray momentum at each point in a cross-section of the spray.

2. The system of claim 1 wherein said energy transforming means is a transducer.

3. The system of claim 1 wherein said energy transforming means is a strain gage.

4. The system of claim 1 wherein said positioning means includes a coordinate measuring apparatus for positioning said probe wire at selected positions within said spray.

5. The system of claim 4 wherein said coordinate measuring apparatus includes a rotary table for positioning said probe wire at a precise angular orientation relative to said nozzle.

6. The system of claim 5 wherein said coordinate measuring apparatus further includes a linear positioning device mechanically attached to said rotary table for positioning said probe wire in a transverse direction along a diameter of said rotary table.

7. The system of claim 6 wherein said coordinate measuring apparatus further includes a fuel injector support column for positioning said nozzle in a vertical plane relative to said probe wire.

8. The system of claim 1 wherein a resonance frequency of said probe assembly avoids resonant vibrations that arise from the frequency of vibration of any naturally-occurring flow structures in said spray.

9. The system of claim 8 wherein said resonance frequency of said probe assembly is approximately three times the frequency of any naturally-occurring flow structures in said spray.

10. A method of creating tomographic reconstructions of spray momentum distributions within a dense, high-pressure spray discharged from a spray nozzle using a tomographic spray momentum mapping system comprised of a probe assembly including a probe wire drawn across a Y-shaped yoke and a force transducer attached in operative relation thereto and being capable of measuring a force impinged by said spray on said wire and generating data output signals in response thereto, a coordinate measuring apparatus for positioning said wire at selected points within said spray, a computer system including output signal conditioning means for processing said output signals, and a computed topography software program for processing said output signals, said method comprising the steps of:

providing said tomographic spray momentum mapping system;

inserting said probe assembly including said force transducer into said spray;

measuring the force impinged by said spray on said wire and generating data output signals in response thereto;

delivering said data output signals to said computer system; and processing said data output signals with said software program to create tomographic reconstructions of said spray momentum distributions.

11. The method of claim 10 wherein the step of inserting further includes the steps of:

positioning said probe assembly at selected points within said spray; and traversing said probe assembly through said spray in a plane perpendicular to the geometric axis of said spray.

12. The method of claim 11 wherein the step of positioning is carried out by positioning means including a coordinate measuring apparatus capable of locating said probe wire at selected points in three dimensions.

13. The method of claim 10 wherein the step of measuring further includes the step of integrating said force in relation to said spray momentum distributions.

14. The method of claim 13 wherein the step of integrating is represented by the equation:

$$F_z = \int \beta \cdot u(x,y) \cdot \rho(x,y) u(x,y) \phi dy = \beta \cdot \phi \int u^2(x,y) \cdot \rho(x,y) dy$$

wherein $u(x,y)$ is the speed of the spray at $(x,y)$, $\rho(x,y)$ is the mass distribution at $(x,y)$, $\phi$ is the diameter of said wire, and $\beta$ is an impact parameter giving an average percentage of axial momentum lost by a droplet hitting said wire.

15. The method of claim 14 wherein said impact parameter is determined by the steps of:

measuring the total momentum of the flow ($J_{tot}$) by allowing said spray to directly strike said transducer; and dividing the value of said total momentum measured by said probe assembly by the value of the equation:

$$\beta = \frac{1}{J_{tot}\phi} \int F_z dx.$$

* * * * *